US010623653B2

(12) United States Patent
Yamamoto et al.

(10) Patent No.: US 10,623,653 B2
(45) Date of Patent: *Apr. 14, 2020

(54) IMAGE ADJUSTMENT APPARATUS AND IMAGE ADJUSTMENT METHOD THAT DETERMINES AND ADJUSTS A STATE OF A BACK LIGHT REGION IN AN IMAGE (71) Applicant: SONY CORPORATION, Tokyo (JP)

(72) Inventors: Eiji Yamamoto, Saitama (JP); Masanori Mikami, Kanagawa (JP); Shunji Okada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,899

(22) Filed: Apr. 4, 2018

(65) Prior Publication Data
US 2018/0227477 A1 Aug. 9, 2018

Related U.S. Application Data (63) Continuation of application No. 14/888,767, filed as application No. PCT/JP2014/001787 on Mar. 27, 2014, now Pat. No. 9,998,676.

(30) Foreign Application Priority Data

May 22, 2013 (JP) .................. 2013-108224

(51) Int. Cl.
H04N 5/222 (2006.01)
H04N 5/235 (2006.01)
H04N 5/232 (2006.01)
H04N 5/243 (2006.01)
G06T 5/00 (2006.01)
G03B 7/091 (2006.01)

(52) U.S. Cl.
CPC ........... *H04N 5/2353* (2013.01); *G03B 7/091* (2013.01); *G06T 5/008* (2013.01); *H04N 5/2351* (2013.01); *H04N 5/23229* (2013.01); *H04N 5/23293* (2013.01); *H04N 5/243* (2013.01)

(58) Field of Classification Search
CPC .................................................. H04N 5/2353
See application file for complete search history.

(56) References Cited

U.S. PATENT DOCUMENTS 6,314,241 B1  11/2001  Matsumura
2007/0292045 A1  12/2007  Akatsuka
(Continued)

FOREIGN PATENT DOCUMENTS

EP  0838942 A2  4/1998
JP  2004-157641 A1  6/2004
(Continued)

OTHER PUBLICATIONS

Notice of Allowance for U.S. Appl. No. 14/888,767, dated Feb. 9, 2018, 04 pages.
Notice of Allowance for U.S. Appl. No. 14/888,767, dated Jan. 17, 2018, 10 pages.
Final Office Action for U.S. Appl. No. 14/888,767, dated Nov. 13, 2017, 08 pages.
(Continued)

Primary Examiner — Gary C Vieaux
(74) Attorney, Agent, or Firm — Chip Law Group (57) ABSTRACT An image adjustment apparatus includes a boundary calculation unit that calculates a boundary between a follow light region and a back light region in an image based on a position of a light source and an image adjustment unit that adjusts a state of the follow light region or the back light region with the boundary being a reference.

15 Claims, 8 Drawing Sheets

(56) References Cited

U.S. PATENT DOCUMENTS

2014/0016026 A1    1/2014    Wolfe et al.
2014/0240477 A1    8/2014    Feng et al.

FOREIGN PATENT DOCUMENTS

| | | |
|---|---|---|
| JP | 2006-252269 A | 9/2006 |
| JP | 2006-252269 A1 | 9/2006 |
| JP | 2007-249568 A | 9/2007 |
| JP | 2007-334427 A | 12/2007 |
| JP | 2010-119035 A | 5/2010 |
| JP | 2013-021660 A | 3/2013 |

OTHER PUBLICATIONS

Non-Final Office Action for U.S. Appl. No. 14/888,767, dated Jun. 1, 2017, 14 pages.

Extended European Search Report for EP Patent Application No. 14800928.5, dated Oct. 28, 2016, 08 pages.

International Search Report and Written Opinion of PCT Application No. PCT/JP2014/001787, dated Jul. 1, 2014, 06 pages of English Translation and 06 pages of ISRWO.

International Preliminary Report on Patentability of PCT Application No. PCT/JP2014/001787, dated Dec. 3, 2015, 08 pages of English Translation and 04 pages of IPRP.

Office Action for CN Patent Application No. 201480027770.3, dated Feb. 5, 2018, 08 pages of Office Action and 13 pages of English Translation.

IMAGE ADJUSTMENT APPARATUS AND IMAGE ADJUSTMENT METHOD THAT DETERMINES AND ADJUSTS A STATE OF A BACK LIGHT REGION IN AN IMAGE

CROSS REFERENCES TO RELATED APPLICATIONS

The present application is a continuation application of U.S. patent application Ser. No. 14/888,767, filed Nov. 3, 2015, which is a National Stage Entry of PCT/JP2014/001787, filed Mar. 27, 2014, and claims the benefit of priority from prior Japanese Patent Application JP 2013-108224, filed May 22, 2013, the entire content of which is hereby incorporated by reference.

TECHNICAL FIELD

The present technology relates to an image adjustment apparatus, an image adjustment method, an image adjustment program, and an imaging apparatus.

BACKGROUND ART

In general, an image capturing apparatus captures an image by measuring light at any one or more points in an image and using an automatic exposure adjustment mechanism based on it. However, in the case where a follow light region and a back light region are both present in an image, it is difficult to capture the image having the follow light region and the back light region that are both easy to view.

If the exposure is set with the follow light region being a reference, the back light region can be too dark. On the contrary, if the exposure is performed with the back light region being a reference, the follow light region can be too bright. Furthermore, if the average photometry of both of the follow light region and the back light region is performed, there is a problem in that the exposure is not sufficiently performed in both the bright and dark regions. In order to address this problem, there has been proposed a technique of controlling an exposure period of time in units of pixels or pixel regions (Patent Document 1).

Patent Document 1: Japanese Patent Application Laid-open No. 2013-21660

SUMMARY OF INVENTION

Problem to be Solved by the Invention

However, if the exposure is changed in units of small regions divided vertically and horizontally, the regions in the image are viewed as rectangles and thus the image can become unnatural.

The present technology has been made in view of the above-mentioned problems, and it is an object to provide an image adjustment apparatus, an image adjustment method, an image adjustment program, and an imaging apparatus, by which an image including both of a follow light region and a back light region is made an image easy to view without unnaturalness can be provided.

Means for Solving the Problem

In order to solve the above-mentioned problems, a first technology is an image adjustment apparatus including: a boundary calculation unit that calculates a boundary between a follow light region and a back light region in an image based on a position of a light source; and an image adjustment unit that adjusts a state of the follow light region or the back light region with the boundary being a reference.

Furthermore, a second technology is an image adjustment method including: calculating a boundary between a follow light region and a back light region in an image based on a position of a light source; and adjusting the state of the follow light region or the back light region with the boundary being a reference.

Furthermore, a third technology is an image adjustment program that causes a computer to execute an image adjustment method including calculating a boundary between a follow light region and a back light region in an image based on a position of a light source, and adjusting the state of the follow light region or the back light region with the boundary being a reference.

In addition, a fourth technology is an imaging apparatus including: an imaging unit that receives light via an optical system and generates an image; a boundary calculation unit that calculates a boundary between a follow light region and a back light region in an image based on a position of a light source; and an image adjustment unit that adjusts a state of the follow light region or the back light region with the boundary being a reference.

Effect of the Invention

According to the present technology, an image including both of a follow light region and a back light region can be made an image easy to view without unnaturalness.

MODE(S) FOR CARRYING OUT THE INVENTION

Hereinafter, embodiments according to the present technology will be described with reference to the drawings. Note that the descriptions will be made in the following order.

<1. First Embodiment>
[1-1. Configurations of Image Adjustment Apparatus and Imaging Apparatus Including Image Adjustment Apparatus]
[1-2. Processing in Image Adjustment Apparatus and Imaging Apparatus]
<2. Second Embodiment>
[2-1. Configuration of Image Display Apparatus Having Functions of Image Adjustment Apparatus and Image Adjustment Apparatus]
[2-2. Processing in Image Adjustment Apparatus and Image Display Apparatus]
<3. Modified Examples>

1. First Embodiment

[1-1. Configurations of Image Adjustment Apparatus and Imaging Apparatus Including Image Adjustment Apparatus]

Figure 1:
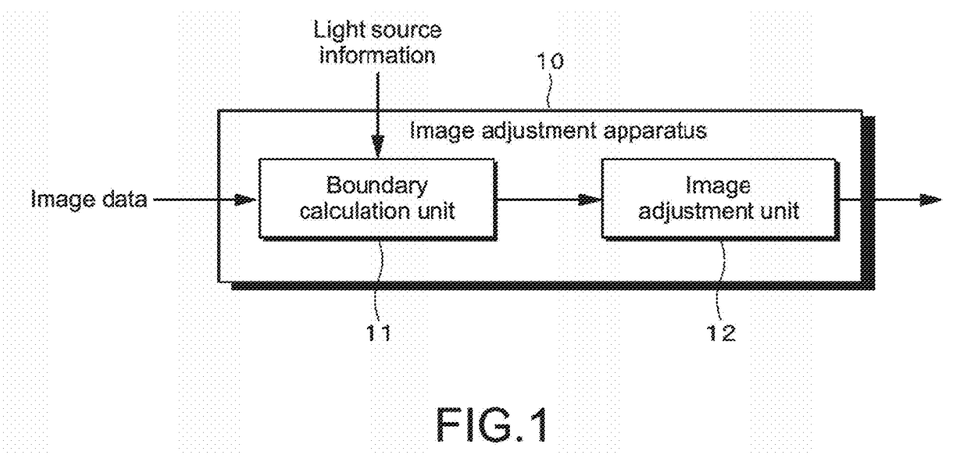
FIG. 1 is a block diagram showing a configuration of an image adjustment apparatus according to a first embodiment of the present technology.
Figure 2:
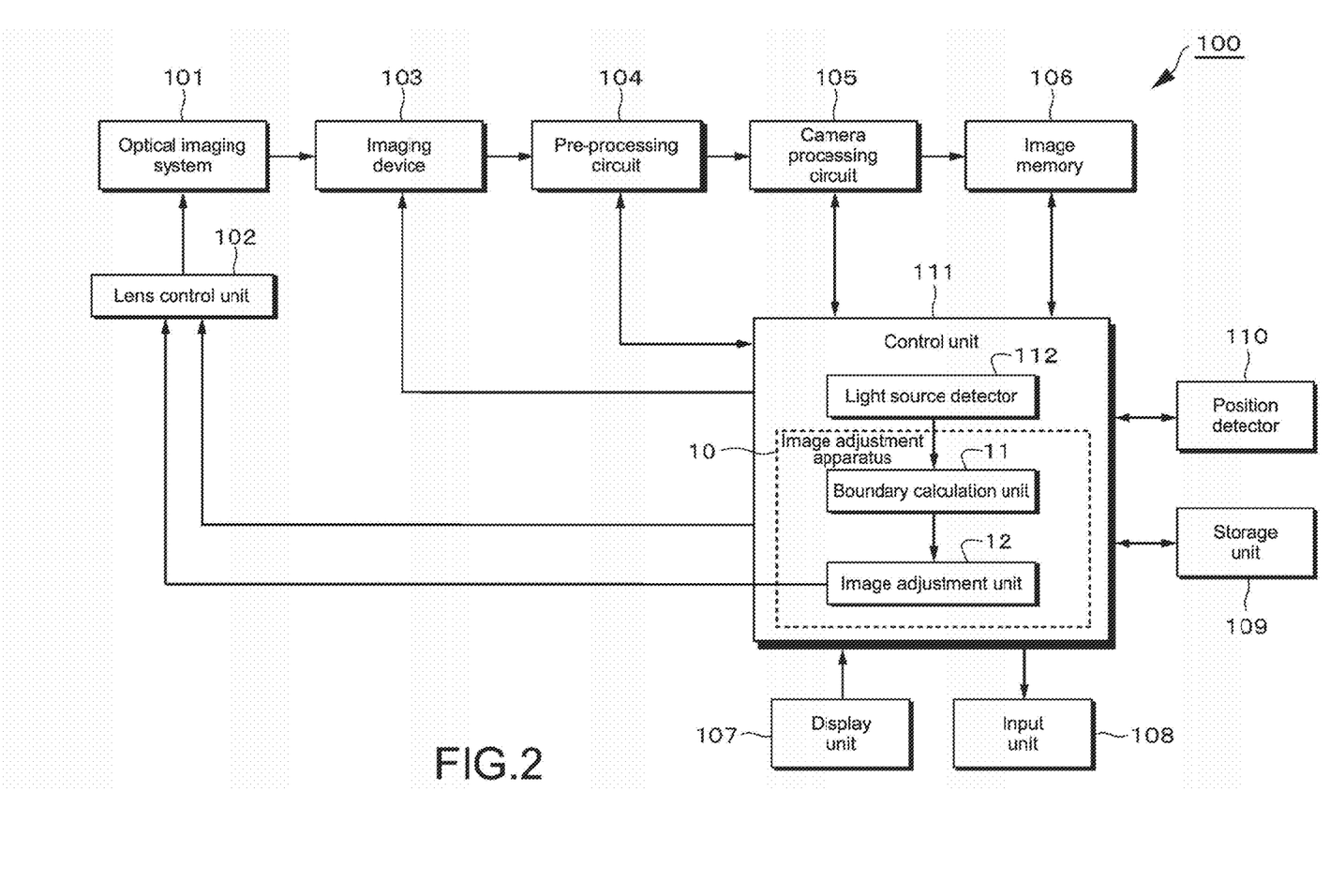
FIG. 2 is a block diagram showing a configuration of an imaging apparatus according to the first embodiment of the present technology.

First, configurations of an image adjustment apparatus 10 and an imaging apparatus 100 having functions of the image adjustment apparatus 10 according to a first embodiment of the present technology will be described. In the first embodiment, it is assumed that the image adjustment apparatus 10 is operated in the imaging apparatus 100.

The image adjustment apparatus 10 includes a boundary calculation unit 11 and an image adjustment unit 12. The boundary calculation unit 11 is supplied with image data as a processing target and light source information indicating a position of a light source in an image according to the image data. As will be described later in detail, the light source information is determined by detection or the like of a light source detector of the imaging apparatus 100 or a light source detection apparatus as an external apparatus.

The boundary calculation unit 11 calculates, based on light source information, a boundary between a region of an image, in which a subject is irradiated with light by a light source from the back of an image capturing position (hereinafter, referred to as follow light region), and a region thereof in which the subject is irradiated with light by a light source from the front of the image capturing position. A boundary calculation method of the boundary calculation unit 11 will be described later. Information indicating the calculated boundary (hereinafter, referred to as boundary information) is supplied to the image adjustment unit 12.

The image adjustment unit 12 performs processing of adjusting a state of the follow light region or the back light region of the image with the boundary being a reference based on the supplied boundary information. The image adjustment unit 12 adjusts the state of at least one of the follow light region and the back light region. Processing of the image adjustment unit 12 will be described later in detail.

FIG. 2 is a block diagram showing the configuration of the imaging apparatus 100 having the functions of the image adjustment apparatus 10. The imaging apparatus 100 is constituted of an optical imaging system 101, a lens control unit 102, an imaging device 103, a pre-processing circuit 104, a camera processing circuit 105, an image memory 106, a display unit 107, an input unit 108, a storage unit 109, a position detector 110, and a control unit 111. Furthermore, the control unit 111 functions as a light source detector 112 and as the boundary calculation unit 11 and image adjustment unit 12 constituting the image adjustment apparatus 10.

The optical imaging system 101 is constituted of, for example, an imaging lens for collecting light from the subject into the imaging device 103 and a drive mechanism, a shutter mechanism, and an iris mechanism that move the imaging lens for focusing or zooming. They are driven under the control of the lens control unit 102. A light image of the subject, which is obtained via the optical imaging system 101, is formed on the imaging device 103.

The lens control unit 102 is, for example, an in-lens microcomputer. The lens control unit 102 controls the drive mechanism, the shutter mechanism, the iris mechanism, and the like of the optical imaging system 101 under the control of the control unit 111 and the image adjustment unit 12. With this, an exposure period of time (shutter speed), a f-stop (f-number), and the like are adjusted.

The imaging device 103 photoelectrically converts incident light from the subject into electric charges and outputs the electric charges as an analog imaging signal. The analog imaging signal output from the imaging device 103 is output to the pre-processing circuit 104. A CCD (Charge Coupled Device), a CMOS (Complementary Metal Oxide Semiconductor), or the like is used as the imaging device 103.

The pre-processing circuit 104 performs sample-hold or the like on the imaging signal output from the imaging device 103 for favorably keeping an S/N (Signal/Noise) ratio by CDS (Correlated Double Sampling). In addition, the pre-processing circuit 104 controls a gain by AGC (Auto Gain Control), performs A/D (Analog/Digital) conversion, and outputs a digital image signal. These processes are performed under the control of the control unit 111.

The camera processing circuit 105 subjects the image signal from the pre-processing circuit 104 to signal processing. The signal processing includes white-balance adjustment, color correction, gamma correction, Y/C conversion, and AE (Auto Exposure).

The image memory 106 is a nonvolatile memory, for example, a buffer memory formed of a DRAM (Dynamic Random Access Memory). The image memory 106 temporarily stores image data subjected to predetermined processing by the pre-processing circuit 104 and the camera processing circuit 105.

The display unit 107 is, for example, a display device formed of an LCD (Liquid Crystal Display), a PDP (Plasma Display Panel), an organic EL (Electro Luminescence) panel, and the like. A through-image being captured, an already captured image stored in the storage unit 109, and the like are displayed on the display unit 107.

The input unit 108 is formed of, for example, a power button for turning on/off a power supply, a release button for instructing to start recording a captured image, an operation element for zoom control, and a touch screen formed integrally with the display unit 107. When an input into the input unit 108 is made, a control signal is generated according to the input and output to the control unit 111. The control unit 111 performs arithmetic processing or control corresponding to the control signal.

The storage unit 109 is, for example, a large-capacity storage medium such as a hard disk, a memory stick (registered trademark of Sony Corporation), an SD memory card. The image is stored in a compressed state according to standards of JPEG (Joint Photographic Experts Group), for example. EXIF (Exchangeable Image File Format) data including information on the stored image and additional information on imaging date and time and the like are also stored in association with the image.

The position detector 110 is constituted of a reception device of a GPS (Global Positioning System). The position detector 110 detects the position of the imaging apparatus 100 based on trajectory data and data on a distance from the GPS satellite to the imaging apparatus 100, which are obtained by receiving GPS radio waves from a GPS satellite and performing predetermined processing. Using a GPS function, latitude and longitude information of the image capturing position can be acquired. Using a magnetic field sensor with the GPS function, an image capturing direction can be acquired. It should be noted that the position detector 110 is not an essential configuration in the imaging apparatus 100.

The control unit 111 is constituted of a CPU (Central Processing Unit), a RAM (Random Access Memory), a ROM (Read Only Memory), and the like. The ROM stores programs and the like read in and operated by the CPU. The RAM is used as a work memory for the CPU. The CPU generally controls the imaging apparatus 100 by executing various types of processing and issuing commands according to the programs stored in the ROM.

In addition, the control unit 111 functions as the light source detector 112 and as the boundary calculation unit 11 and image adjustment unit 12 constituting the image adjustment apparatus 10 by executing predetermined programs. It should be noted that the configurations thereof may be not only realized by the programs but also realized by combining dedicated apparatus, circuit, and the like using hardware having the respective functions.

The light source detector 112 detects the position of the light source in the image as the processing target. For example, a method of detecting the light source based on a luminance distribution in the image, which is a well-known technique, can be used as the method of detecting the light source by the light source detector 112. It should be noted that, although it is not limited thereto, any method can be employed as long as it is a well-known method by which the light source can be detected. Furthermore, if the light source is not present in the image, the position of the light source can be detected by the use of a sensor for detecting the light source.

If the light source is the sun, it is also possible to detect a position of the sun as the light source by determining attitude and direction of the sun based on latitude and longitude information at an image capturing point and information on image capturing date and image capturing point of time and matching the attitude and direction of the sun with the image capturing direction. The latitude and longitude information at the image capturing point and the image capturing direction can be acquired by the GPS function and the like of the position detector 110. The image capturing date and time and the image capturing point of time can be acquired by RTC (Real Time Clock) of the control unit 111, for example, other than using the GPS function.

The light source information detected by the light source detector 112 is supplied to the boundary calculation unit 11.

The boundary calculation unit 11 determines, based on the light source information, the boundary between the follow light region and the back light region in the image. The boundary calculation unit 11 is supplied with the image data and the light source information. When the image adjustment apparatus 10 is operated in the imaging apparatus 100, the image data as the processing target is, for example, frame images constituting a through-image, which are acquired by the imaging device 103 of the imaging apparatus 100. If the processing target is frame images constituting a through-image, it is possible to acquire an image subjected to processing according to the present technology by imaging.

Figure 3:
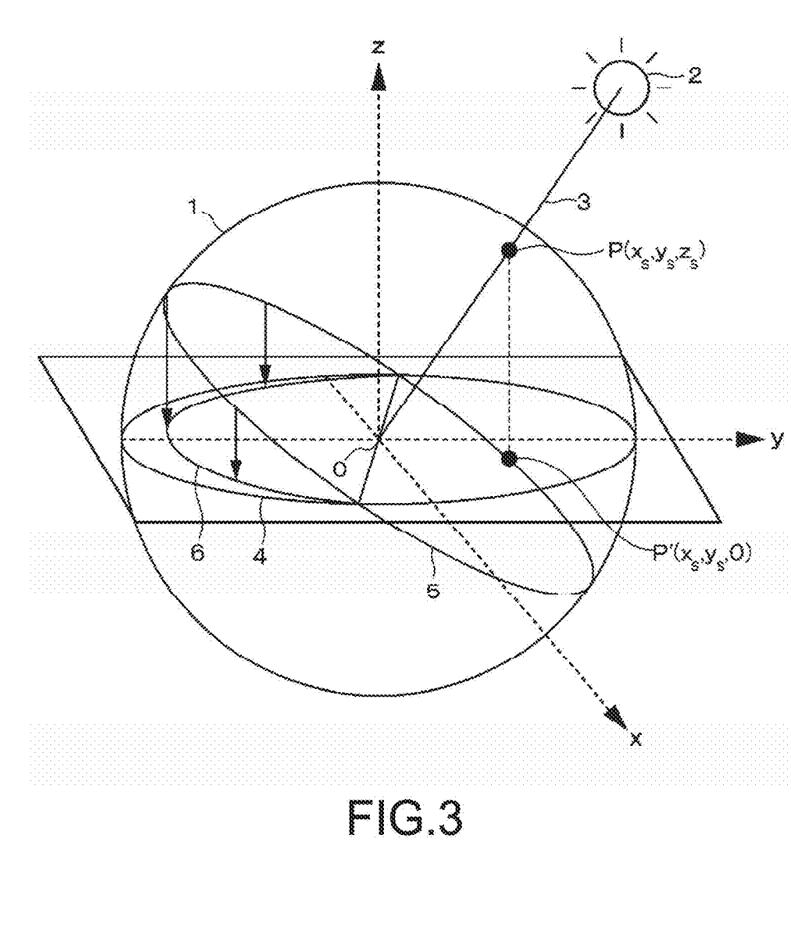
FIG. 3 is a virtual spherical model of a fisheye lens of an orthographic projection system.

The boundary calculation unit 11 calculates the boundary between the follow light region and the back light region in the image based on the supplied image information and light source information. Referring to FIG. 3, the boundary calculation method will be described. FIG. 3 is a virtual spherical model of a fisheye lens of an orthographic projection system.

First, it is assumed that incident light 3 enters a light source 2 toward an origin 0 that is a center of a fisheye lens virtual spherical model 1 having a radius r. An intersection point P' between a perpendicular line drawn from an intersection point P between the incident light 3 and the fisheye lens virtual spherical model 1 to a fisheye lens image capturing surface 4 and the fisheye lens image capturing surface is a position of the light source 2 projected on the fisheye lens image capturing surface 4.

Considering a plane 5 that is vertical to the incident light 3 and includes the origin 0, one of two spaces divided by this plane 5, which is closer to the light source 2, is the back light region and the other on an opposite side of the light source 2 is the follow light region. A boundary line 6 between the back light region and the follow light region on the fisheye lens image capturing surface 4 can be calculated in the following manner.

An arbitrary point of the radius r on the fisheye lens virtual spherical model 1 is set to (x, y, z). Furthermore, a vector is set as shown in Expressions 1 and 2 below.

[Expression 1]

$$\vec{p} = (x, y, z) \quad (1)$$

[Expression 2]

$$\vec{OP} = \vec{v} \quad (2)$$

Then, the fisheye lens virtual spherical model 1 is expressed by a vector equation of Expression (3) below.

[Expression 3]

$$\vec{p} \cdot \vec{p} = r^2 \quad (3)$$

Furthermore, the plane 5 vertical to the incident light 3 is expressed by a vector equation of Expression (4) below.

[Expression 4]

$$\vec{v} \cdot \vec{p} = 0 \quad (4)$$

Next, an intersection point between Expression (3) and Expression (4) is calculated. Expression (5) that can be described from Expression (1) above and Expression (2) above is substituted for Expression (3) and Expression (4). As a result, Expression (6) and Expression (7) below are obtained.

[Expression 5]

$$\vec{OP} = \vec{v}(x_s, y_s, z_s) \quad (5)$$

[Expression 6]

$$x^2 + y^2 + z^2 = r \quad (6)$$

[Expression 7]

$$x_s x + y_s y + z_s z = 0 \quad (7)$$

Expression (8) below is derived from Expression (7).

[Expression 8]

$$z = -\frac{x_s x + y_s y}{z_s} \quad (8)$$

By substituting Expression (8) for Expression (6) above, Expression (9) below is obtained.

[Expression 9]

$$x^2 + y^2 + \left(-\frac{x_s x + y_s y}{z_s}\right)^2 = r \quad (9)$$

Here, by setting $x = u*\cos\theta$ and $y = u*\sin\theta$ and substituting them for Expression (9) above, Expression (10) below is obtained.

[Expression 10]

$$u^2\cos^2\theta + u^2\sin^2\theta + \left(-\frac{x_s u\cos\theta + y_s u\sin\theta}{z_s}\right)^2 = r \quad (10)$$
$$u^2 z_s^2 (\cos^2\theta + \sin^2\theta) + u^2(x_s\cos\theta + y_s\sin\theta)^2 = r z_s^2$$
$$u^2 \{z_s^2 + (x_s\cos\theta + y_s\sin\theta)^2\} = r z_s^2$$
$$u^2 = \frac{r z_s^2}{z_s^2 + (x_s\cos\theta + y_s\sin\theta)^2}$$

Since it is obvious that u in Expression (10) takes a positive value, Expression (11) below is derived from Expression (10).

[Expression 11]

$$u = \sqrt{\frac{r z_s^2}{z_s^2 + (x_s\cos\theta + y_s\sin\theta)^2}} \quad (11)$$

Therefore, the boundary line 6 between the follow light region and the back light region on the fisheye lens image capturing surface 4 is expressed by Expressions (12) and (13) below.

[Expression 12]

$$x = \cos\theta \sqrt{\frac{r z_s^2}{z_s^2 + (x_s\cos\theta + y_s\sin\theta)^2}} \quad (12)$$

$$y = \sin\theta \sqrt{\frac{r z_s^2}{z_s^2 + (x_s\cos\theta + y_s\sin\theta)^2}} \quad (13)$$

In this manner, the boundary calculation unit 11 calculates the boundary line 6 between the follow light region and the back light region by calculation. The boundary calculation unit 11 supplies boundary information indicating the calculated boundary line to the image adjustment unit 12.

The image adjustment unit 12 acquires a luminance distribution of the follow light region and the back light region in the image based on the supplied boundary information and performs image adjustment processing.

If the image adjustment apparatus 10 is operated in the imaging apparatus 100, the image adjustment unit 12 determines an exposure value (EV) such that the follow light region and the back light region in the image has a suitable luminance. In addition, an exposure period of time in the optical imaging system 101 of the imaging apparatus 100 is set such that the exposure value can be obtained.

The image adjustment unit 12 transmits a predetermined control signal indicating setting information of the exposure period of time to the lens control unit 102. The lens control unit 102 operates the shutter mechanism in the optical imaging system 101 based on the supplied control signal and adjusts the exposure period of time. By adjusting this exposure period of time, the luminance of the image is adjusted. The image adjustment unit 12 adjusts the state of at least one of the follow light region and the back light region.

The image adjustment unit 12 sets a exposure period of time, for example, such that the luminance of the back light region coincides with the luminance of the follow light region in the image. More specifically, for example, a luminance of each pixel in the back light region coincides with an average luminance of the follow light region in the image.

Alternatively, the image adjustment unit 12 may calculated an average value of the luminance of the follow light region and the luminance of the back light region and set an exposure period of time such that the luminances of the follow light region and the back light region coincide with the average luminance.

In addition, the image adjustment unit 12 may set an exposure period of time such that the luminances of the follow light region and the back light region coincide with an optimal luminance level in a display apparatus such as the display unit 107 and the external monitor used for display of the image. In this case, it is favorable to cause the image adjustment unit 12 to retain an optimal luminance level of the display unit 107 or an external display apparatus in advance.

Note that the user may be able to select which of setting methods for an exposure period of time described above is used, by input into the imaging apparatus 100.

The image adjustment unit 12 may set the exposure period of time in units of pixels or may set the exposure period of time in units of regions (pixel regions) formed of a plurality of pixels. If the exposure period of time is set in units of pixels, it is possible to further reduce uncomfortable feeling due to difference in luminance in the image.

In the above-mentioned manner, the image adjustment apparatus 10 and the imaging apparatus 100 having the functions of the image adjustment apparatus 10 are configured. Note that processing performed by the image adjustment apparatus 10 can be executed by hardware or software. If processing by the software is executed, a program recording a processing sequence is executed by installing a memory of the control unit 111 of the imaging apparatus 100.

For example, the program can be recorded in a recording medium such as a hard disk and a ROM in advance. Alternatively, the program can be recorded in a recording medium such a CD-ROM (Compact Disc Read Only Memory), a DVD (Digital Versatile Disc), and a semiconductor memory. Such a recording medium can be provided as package software. The user installs the package software into the imaging apparatus 100.

Note that, in addition to installing the program from the recording medium as described above into the imaging apparatus 100, one provided as an application in the Internet can also be transferred to the imaging apparatus 100 and installed.

[1-2. Processing in Image Adjustment Apparatus and Imaging Apparatus]

Figure 4:
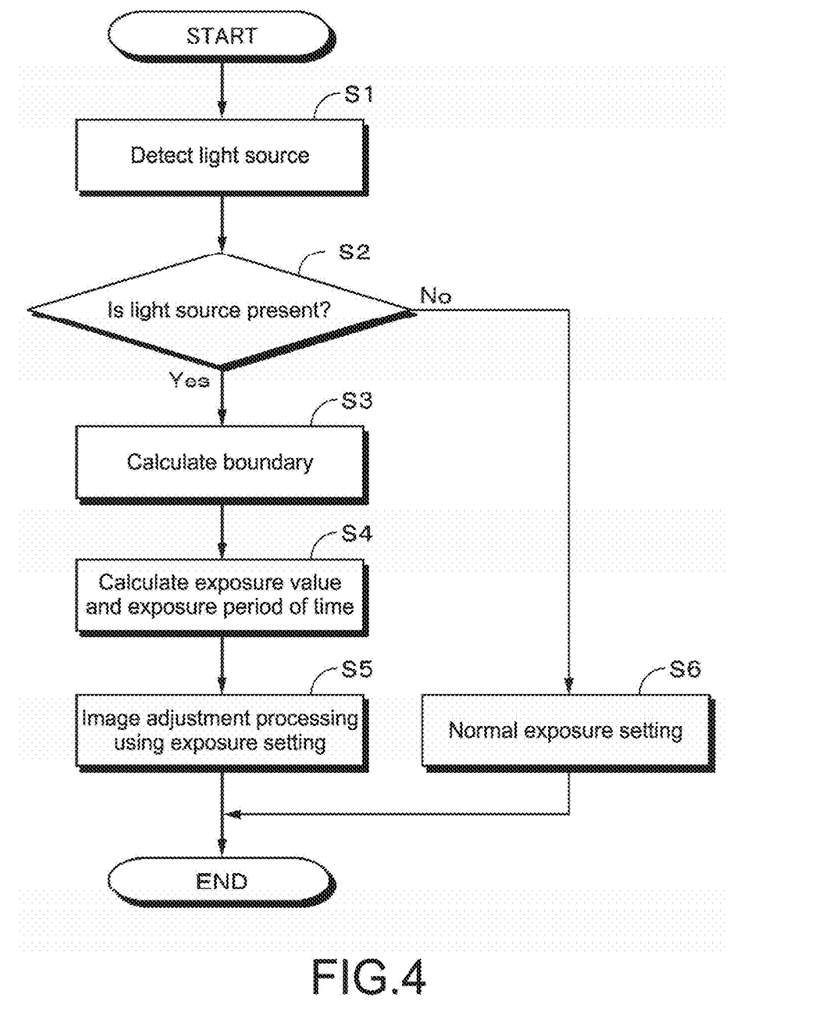
FIG. 4 is a flowchart showing a flow of processing in the first embodiment.

Next, a flow of processing performed in the image adjustment apparatus 10 and the imaging apparatus 100 having the functions of the image adjustment apparatus 10 will be described referring to FIG. 4. FIG. 4 is a flowchart showing the flow of processing. It is assumed that the image data of the processing target is supplied.

First, in Step S1, light source detection processing is performed by the light source detector 112. If a light source is present, the processing proceeds from Step S2 to Step S3 (Yes of Step S2). Note that, as described above, the light source information detected by the light source detector 112 is supplied from the light source detector 112 to the boundary calculation unit 11.

Next, in Step S3, the boundary between the follow light region and the back light region in the image is calculated by the boundary calculation unit 11. The calculated boundary information is supplied to the image adjustment unit 12. Next, in Step S4, the exposure value and the exposure period of time are calculated by the image adjustment unit 12. In Step S5, the image adjustment unit 12 performs image adjustment processing by transmitting a control signal to the lens control unit 102 such that the lens is driven according to the calculated exposure period of time.

The description will be continued referring back to Step S2. If the light source is not detected by the light source detection in Step S2, the processing proceeds to Step S6 (No in Step S2). In Step S6, a normal exposure setting is made. In the normal exposure setting, the boundary calculation unit 11 and the image adjustment unit 12 of the present technology are not operated.

Figure 5A:
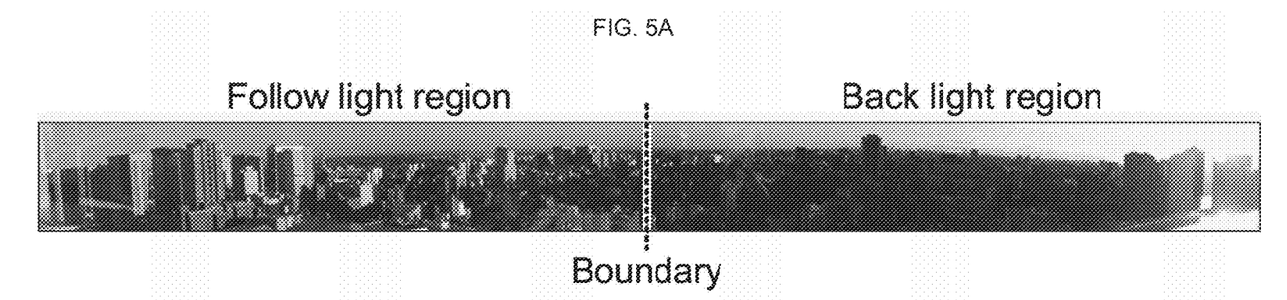
FIG. 5A is an example of an image not subjected to processing according to the present technology and FIG. 5B is an example of an image subjected to processing according to the present technology.

In the above-mentioned manner, the image adjustment processing in the first embodiment of the present technology is performed. Effects of processing according to the present technology will be explained with reference to FIG. 5. FIG. 5A is an example of an image not subjected to processing according to the present technology. On the other hand, FIG. 5B is an image obtained by processing according to the present technology.

Figure 5B:
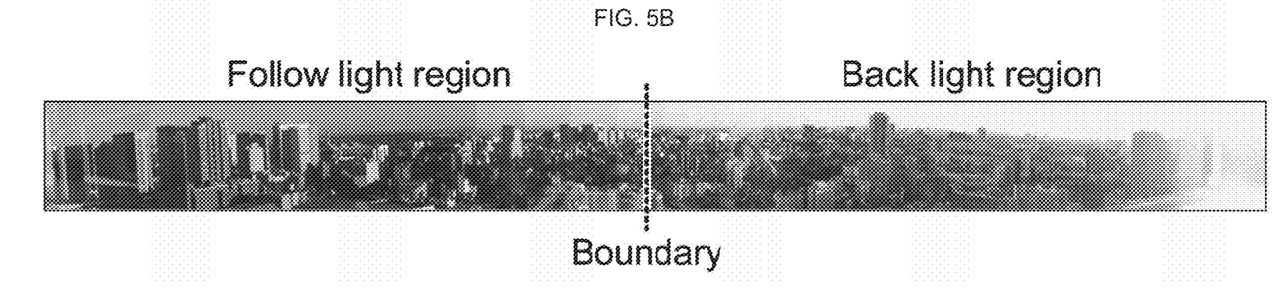

In both of FIGS. 5A and 5B, a broken line at substantially a center of each image is a boundary between a follow light region and a back light region, which is calculated by the boundary calculation unit 11. Furthermore, in both of FIGS. 5A and 5B, a left side with respect to the boundary is the follow light region and a right side with respect to the boundary is the back light region.

In FIG. 5A, in the follow light region, the luminance is high and it is easy to view a subject, and hence the user can easily view the subject. On the other hand, the back light region has a low luminance, and hence the subject is dark and the user cannot clearly view the subject.

On the other hand, as shown in FIG. 5B, the luminance of the back light region is increased to a level equivalent to the luminance of the follow light region by performing processing of the present technology on the image of FIG. 5A. With this, the back light region is brighter and it is easier to view the subject in the back light region.

According to an embodiment of the present technology, if a captured image includes both of a follow light region and a back light region, a position of a light source is first determined and, with a boundary line between the follow light region and the back light region, which is obtained by the arithmetic operation, being a reference, the exposure period of time of the imaging apparatus 100 is adjusted. With this, it becomes easy to view both of the region dark due to back light and the region bright due to follow light and the boundary line with respect to which the period of exposure time is changed can be made inconspicuous. Thus, it is possible to obtain an image without uncomfortable feeling.

In the case of using the fisheye lens or the like to capture a wide-angle image, cases where a subject in follow light and a subject in back light are included in a single image are increased. In the general imaging apparatus 100, the darkness and brightness of the follow light region and the back light region are clear and it is an image difficult to view as a whole. However, according to the present technology, the luminance of the back light region is increased and the difference of the brightness and darkness between the follow light region and the back light region is reduced, such that an image easy to view can be obtained. In particular, using the present technology in a device capable of capturing an ultra-wide-angle image using the fisheye lens or the like in capturing an image and enlarging a part thereof for viewing during reproduction, a better image can be obtained. It should be noted that the present technology is applicable also in the case of using a wide-angle lens or a special lens other than the fisheye lens.

Figure 6A:
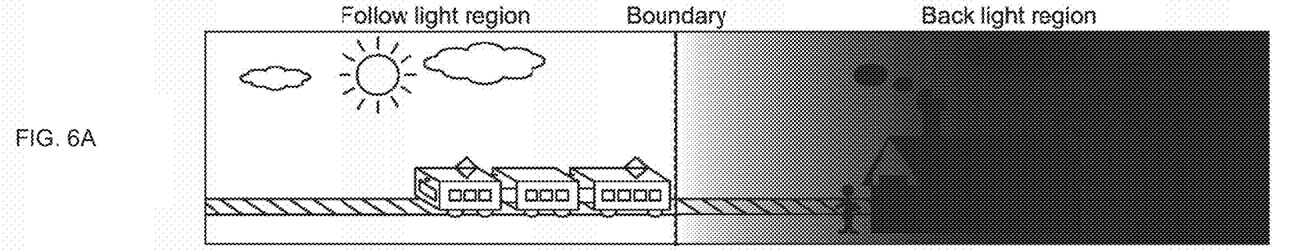
FIG. 6A is a diagram showing an example of an image as a processing target.
Figure 6B:
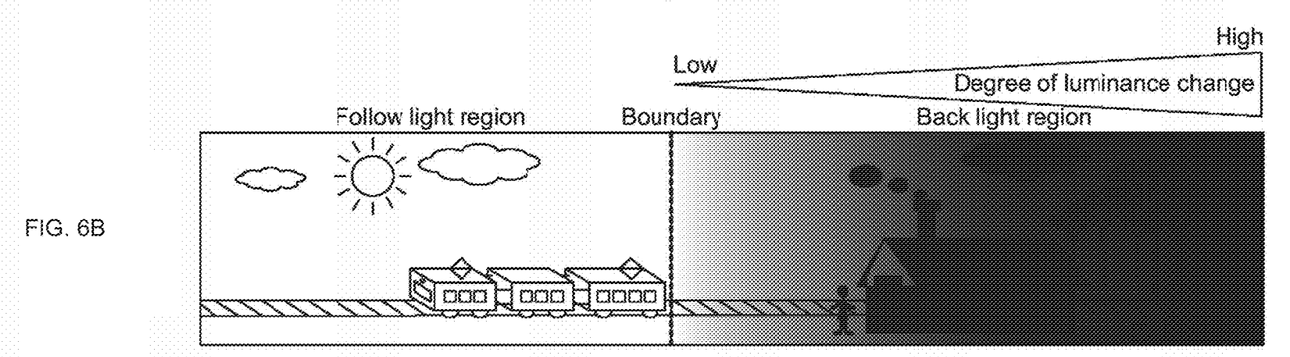
FIG. 6B is a diagram showing gradually changing the luminance of the image.
Figure 6C:
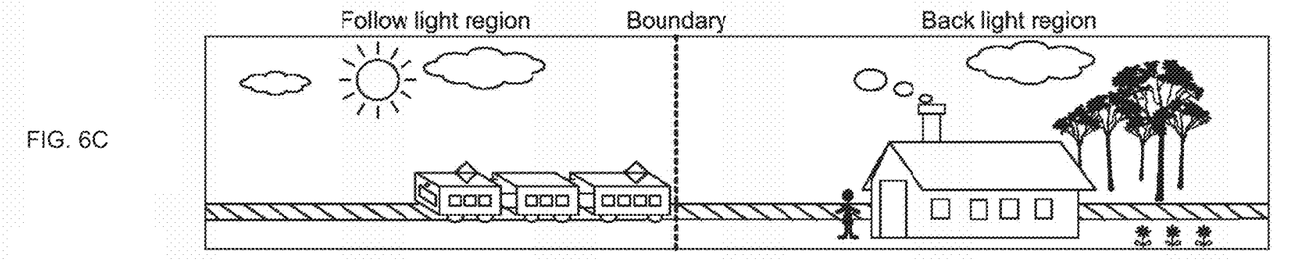
FIG. 6C is a diagram showing an image subjected to processing.

Note that the image adjustment unit 12 may perform processing such that the luminance is gradually changed in order to obtain an image without uncomfortable feeling of the follow light region and the back light region. This point will be described referring to FIG. 6.

For example, as shown in FIG. 6A, even in the back light region, a region closer to the follow light region can be relatively bright and a region far from the follow light region can be dark. In such a case, if the luminance in the entire back light region is uniformly increased, the region of the back light region, which is far from the follow light region, can have a brightness equivalent to that of the follow light region but the region of the back light region, which is closer to the follow light region, can become too bright.

In such a case, as shown in FIG. 6B, the degree of luminance change is gradually changed from the region of the back light region, which is closer to the follow light region, to the region of the back light region, which is far from the follow light region. Further, the increase of the luminance in the region closer to the follow light region is made small to have a level equivalent to that of the follow light region and the luminance in the region far from the follow light region is largely increased to have a level equivalent to that of the follow light region.

With this, as shown in FIG. 6C, an image that provides no uncomfortable feeling between the follow light region and the back light region and no uncomfortable feeling also in the back light region can be obtained. Note that this processing is applicable also to processing with respect to the follow light region.

Note that, when exposure processing in units of pixels or pixel regions is performed with the boundary line between the follow light region and the back light region being a reference, the exposure setting may be gradually changed in a certain region sandwiching the boundary.

Note that, in the case where a plurality of light sources are present in an image, the boundary may be calculated for each of the light sources and the adjustment processing of the image adjustment unit 12 may be performed for each of the light sources.

2. Second Embodiment

[2-1. Configuration of Image Display Apparatus Having Functions of Image Adjustment Apparatus and Image Adjustment Apparatus]

Figure 7:
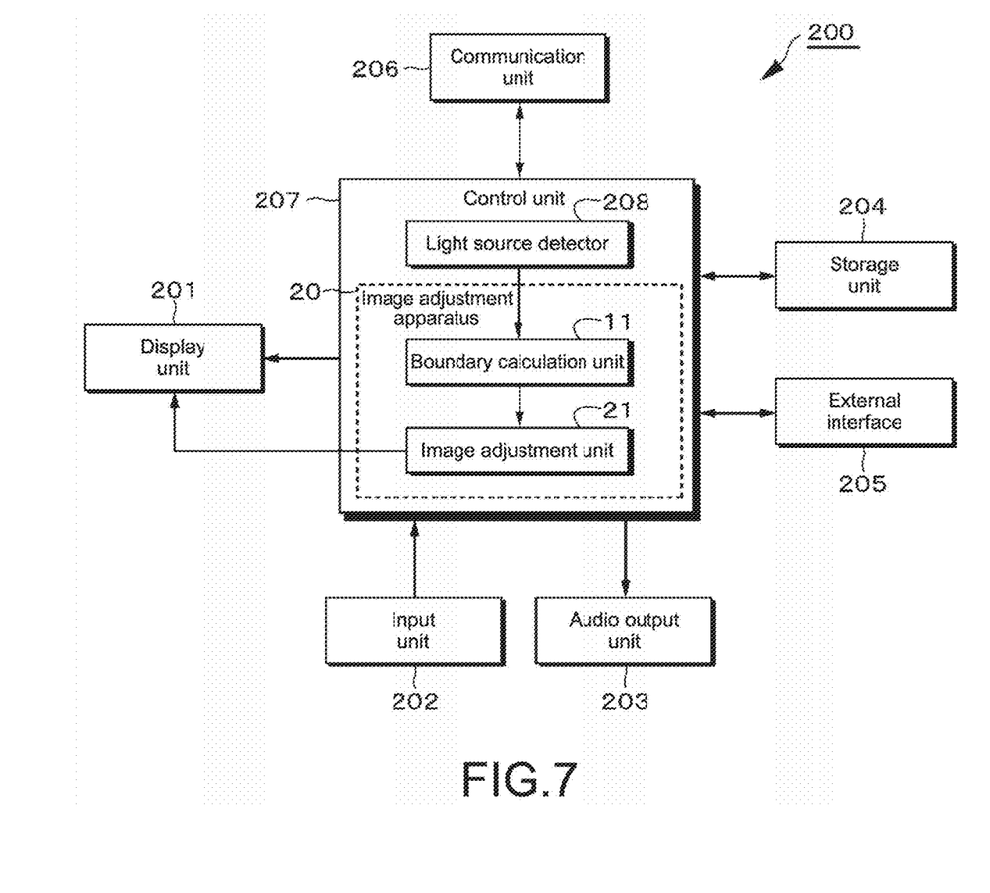
FIG. 7 is a diagram showing a configuration of an image display apparatus according to a second embodiment of the present technology.

Next, a second embodiment of the present technology will be described. In the second embodiment, an image adjustment apparatus 20 is operated in an image display apparatus 200. FIG. 7 is a block diagram showing a configuration of the image display apparatus 200 according to the second embodiment. Note that a configuration of the image adjustment apparatus 20 is the same as that of the first embodiment.

The image display apparatus 200 is an apparatus capable of displaying an image. The image display apparatus 200 includes, for example, a personal computer, a tablet terminal, a television receiver, a smartphone, and a cellular phone. The image display apparatus 200 is constituted of a display unit 201, an input unit 202, an audio output unit 203, a storage unit 204, an external interface 205, a communication unit 206, and a control unit 207. Furthermore, the control unit 207 functions as a light source detector 208 and as boundary calculation unit 11 and image adjustment unit 21 constituting the image adjustment apparatus 20.

The display unit 201 is, for example, a display means configured by an LCD, a PDP, an organic EL panel, and the like. An image and a video stored in the storage unit 204 and an image and a video stored in an external storage medium input via the external interface 205, and the like are displayed on the display unit 201.

The input unit 202 inputs an instruction with respect to the image display apparatus 200 from the user, the input unit 202 being formed of a hardware button, a touch panel, or the like. When the input into the input unit 202 is made, a control signal corresponding to the input is generated and output to the control unit 207. The control unit 207 performs arithmetic processing or control corresponding to the control signal.

The audio output unit 203 is a speaker that outputs audio content such as music and sounds associated with an image or video, for example.

The storage unit 204 is, for example, a large-capacity storage medium such as a hard disk, a memory stick (registered trademark of Sony Corporation), and an SD memory card. The image is, for example, stored in a compressed state according to standards of JPEG or the like.

The external interface 205 is, for example, an interface for transmitting and receiving information to/from an external apparatus, such as a USB (Universal Serial Bus). Examples of the external apparatus connected via the external interface 205 can include a digital camera, a smart phone, a cellular phone, and a laptop personal computer. The image display apparatus 200 is supplied with image data also from the external interface 205.

The communication unit 206 is, for example, a communication module for communicating with other apparatuses and the like via a network such as the Internet and a dedicated line according to a predetermined protocol. Any can be used for the communication system, for example, wired communication and communication using a wireless LAN (Local Area Network), Wi-Fi (Wireless Fidelity), LTE (Long Term Evolution), or a 3G line.

Furthermore, the image display apparatus 200 may include a module for Bluetooth communication. According to a Bluetooth module, data exchange with various content reproduction apparatuses that are external Bluetooth devices is enabled to be performed.

The control unit 207 is constituted of a CPU, a RAM, a ROM, and the like. Programs and the like read in and operated by the CPU are stored in the ROM. The RAM is used as a work memory for the CPU. The CPU generally controls the image display apparatus 200 by executing various types of processing according to the programs stored in the ROM and issuing commands.

In addition, by executing predetermined programs, the control unit 207 functions as the light source detector 208 and as the boundary calculation unit 11 and image adjustment unit 21 constituting the image adjustment apparatus 20. It should be noted that the configurations thereof may be not only realized by the programs but also realized by combining dedicated apparatus, circuit, and the like using hardware having the respective functions.

In the second embodiment, an already captured image stored in the storage unit 204 or an already captured image input via the external interface 205 is displayed on the display unit 201 after processing of the image adjustment apparatus 20.

The light source detector 208 detects the position of the light source in the image data as the processing target. For example, a method of detecting the light source based on a luminance distribution in the image, which is a well-known technique, can be used as a method of detecting the light source by the light source detector 208.

Note that, if image data displayed on the image display apparatus 200 after processing of the image adjustment apparatus 20 includes light source information as metadata, light source detection processing by the light source detector 112 is unnecessary. The boundary calculation unit 11 uses the light source information associated with the image data as the metadata thereof to thereby calculate a boundary.

The boundary calculation unit 11 calculates the boundary between the follow light region and the back light region in the image. The boundary calculation unit 11 is supplied with image data from an external storage medium via the storage unit 204 or the external interface 205. Furthermore, the light source information associated with the image data as the metadata is also supplied. The boundary calculation unit 11 calculates the boundary in the image according to the image data based on the light source information. The calculated boundary information is supplied to the image adjustment unit 21. Note that the boundary calculation method is the same as that described in the first embodiment.

The image adjustment unit 21 acquires a luminance distribution of the follow light region and the back light region in the image based on the supplied boundary information and performs adjustment processing of the luminance of the image displayed on the display unit 201. The image adjustment unit 21 adjusts the state of at least one of the follow light region and the back light region. The image adjustment unit 21 performs the luminance adjustment, for example, such that the luminance of the back light region coincides with the luminance of the follow light region in the image. More specifically, the image adjustment unit 21 performs the luminance adjustment, for example, such that the luminance of each pixel in the back light region coincides with an average luminance of the follow light region in the image.

Alternatively, an average value of the luminance of the follow light region and the luminance of the back light region may be calculated and the luminance adjustment may be performed such that the luminances of the follow light region and the back light region both coincide with the average luminance. In addition, the luminance adjustment may be performed such that the luminances of the follow light region and the back light region coincide with an optimal luminance level on the display unit 201 that displays the image. In this case, it is favorable to cause the image adjustment unit 21 to retain the optimal luminance level of the display unit 201 in advance. The luminance of the image may be adjusted in units of pixels of the image data or in units of pixel regions formed of a plurality of pixels.

The image adjustment unit 21 may perform the luminance adjustment in units of pixels or the luminance adjustment may be performed in units of regions formed of a plurality of pixels (pixel regions). If the luminance is adjusted in units of pixels, it is possible to further reduce uncomfortable feeling due to the difference of the luminance in the image.

In the above-mentioned manner, the image adjustment apparatus 20 and the image display apparatus 200 according to the second embodiment are configured.

[2-2. Processing in Image Adjustment Apparatus and Image Display Apparatus]

Figure 8:
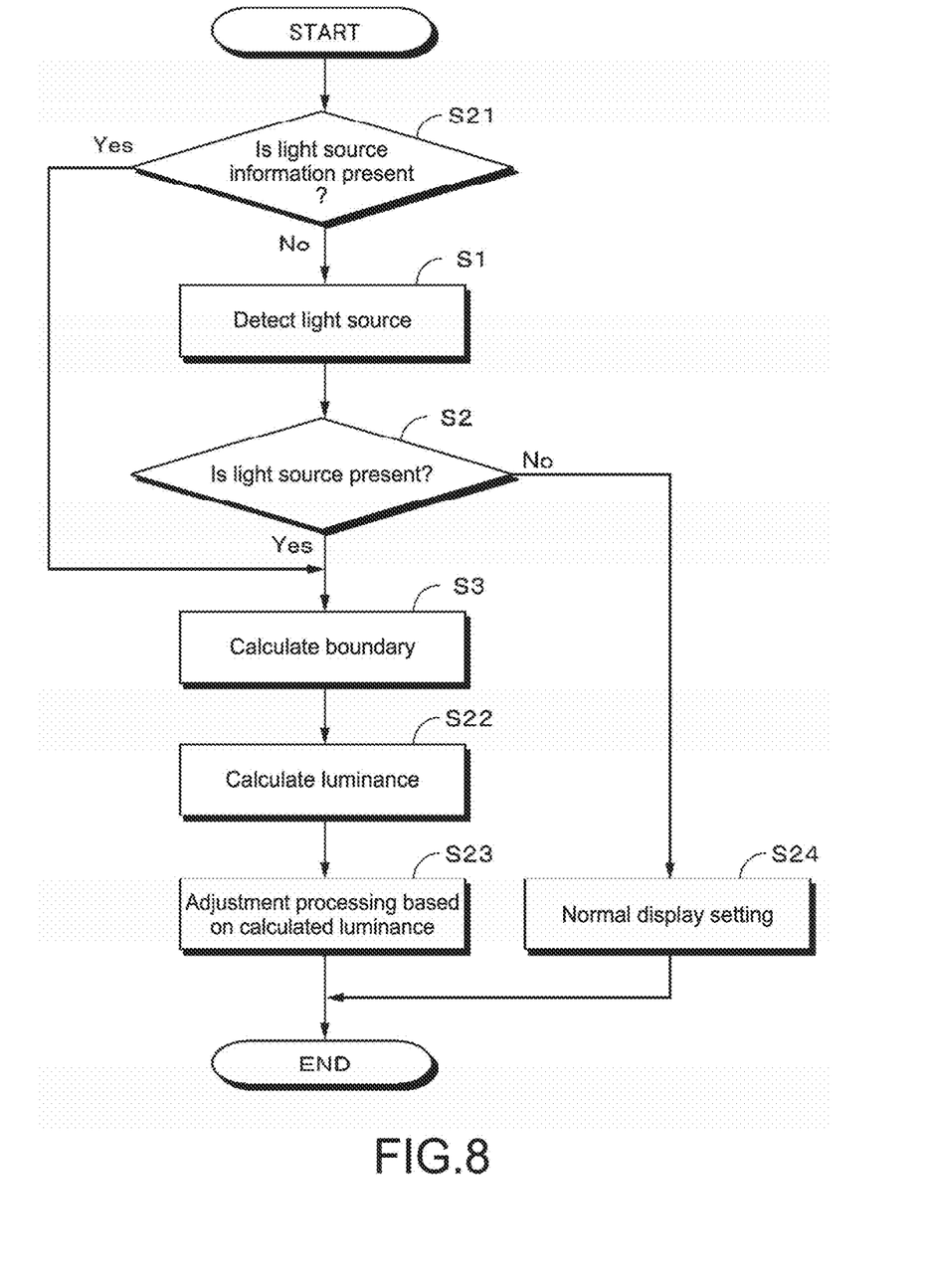
FIG. 8 is a flowchart showing a flow of processing in the second embodiment.

Next, a flow of processing performed in the image adjustment apparatus 20 and the image display apparatus 200 having the functions of the image adjustment apparatus 20 will be described with reference to FIG. 8. FIG. 8 is a flowchart showing the flow of processing performed by the image adjustment apparatus 20 and the image display apparatus 200. It is assumed that the image data of the processing target is supplied.

First, in Step S21, the control unit 207 checks whether or not the image data to be displayed includes light source information as metadata. In Step S21, if the image data includes the light source information as the metadata, the processing proceeds to Step S3 (Yes of Step S21). In this case, the light source information is already present, and hence light source detection processes in Steps S1 and 2 are not performed.

In Step S3, the boundary calculation unit 11 calculates a boundary in an image using the light source information associated with the image data as the metadata.

In Step S3, after the boundary calculation unit 11 calculates the boundary, the processing proceeds to Step S22. Next, in Step S22, the image adjustment unit 21 calculates luminances of a follow light region and a back light region in the image for displaying the image based on the boundary information in an optimal state. The image adjustment unit 21 supplies, in Step S23, a predetermined control signal to the display unit 201 such that the image display is performed at the calculated luminance. With this, in the display unit 201, the image is displayed in a state in which the luminance is adjusted.

The description will be continued referring back to Step S21. If the image data does not include the light source information as the metadata, the processing proceeds to Step S1 (No in Step S21). Next, in Step S1, the light source detection processing of the light source detector 208 is performed. Note that Steps S1 to S3 are the same processing as that of the first embodiment, and hence a description thereof will be omitted. Based on the light source information detected by the light source detector 208, processes of Steps S22 and S23 are performed. The processes of Steps S22 and S23 are the same as those described above.

The description will be continued referring back to Step S2. If the light source is not detected by the light source detection in Step S2, the processing proceeds to Step S24 (No in Step S2). In Step S24, a normal display setting is made. In the normal display setting, the boundary calculation unit 11 and the image adjustment unit 21 of the image adjustment apparatus 20 are not operated.

Note that, in the case where the image display apparatus 200 does not include the light source detector 208 and the light source information can be obtained as the metadata of the image data, if the light source information is not present, the image is displayed in the normal luminance setting in Step S24.

In the above-mentioned manner, processing in the image adjustment apparatus 20 and the image display apparatus 200 according to the second embodiment is performed. According to the second embodiment, the present technology is applicable not when the imaging apparatus 100 captures an image but when the already captured image is displayed. Therefore, even in the case of an image captured with the back light region being dark, an image having a bright back light region can be displayed.

3. Modified Examples

Hereinabove, the embodiments of the present technology have been specifically described. However, the present technology is not limited to the above-mentioned embodiments and various modifications based on technical ideas of the present technology can be made.

The image adjustment apparatus according to the present technology is not limited to the imaging apparatus and the image display apparatus and is applicable also to an image output apparatus such as a printer and a copy machine, which outputs an image onto a medium such as paper, cloth, and the like. Examples of fields in which the present technology is used may include image display and the like in a normal camera, a monitoring camera, a printer, a display, and the like. Furthermore, the present technology is applicable also to a moving image in addition to a still image.

It should be noted that the present technology may also take the following configurations.

(1) An Image Adjustment Apparatus, Including:

a boundary calculation unit that calculates a boundary between a follow light region and a back light region in an image based on a position of a light source; and an image adjustment unit that adjusts a state of the follow light region or the back light region with the boundary being a reference.

(2) The image adjustment apparatus according to (1), in which the image adjustment unit adjusts the state of the follow light region or the back light region by adjusting an exposure period of time in capturing the image.

(3) The image adjustment apparatus according to (1), in which the image adjustment unit adjusts the state of the follow light region or the back light region by adjusting a luminance in displaying the image.

(4) The image adjustment apparatus according to any one of (1) to (3), in which the image adjustment unit performs adjustment such that the luminance of the back light region coincides with the luminance of the follow light region.

(5) The image adjustment apparatus according to any one of (1) to (3), in which the image adjustment unit performs adjustment such that the luminances of the follow light region and the back light region coincide with an average of the luminance of the follow light region and the luminance of the back light region.

(6) The image adjustment apparatus according to any one of (1) to (3), in which the image adjustment unit performs adjustment according to an optimal luminance in the display unit on which the image is displayed.

(7) An image adjustment method, including:

calculating a boundary between a follow light region and a back light region in an image based on a position of a light source; and adjusting the state of the follow light region or the back light region with the boundary being a reference.

(8) An image adjustment program that causes a computer to execute an image adjustment method including calculating a boundary between a follow light region and a back light region in an image based on a position of a light source, and adjusting the state of the follow light region or the back light region with the boundary being a reference.

(9) An imaging apparatus, including:

an imaging unit that receives light via an optical system and generates an image;

a boundary calculation unit that calculates a boundary between a follow light region and a back light region in an image based on a position of a light source; and an image adjustment unit that adjusts a state of the follow light region or the back light region with the boundary being a reference.

DESCRIPTION OF REFERENCE NUMERALS 10, 20 image adjustment apparatus
11 boundary calculation unit
12, 21 image adjustment unit
100 imaging apparatus
103 imaging device

The invention claimed is:

1. An image adjustment apparatus, comprising:
   circuitry configured to:
   determine a back light region in an image based on a position of a light source, wherein the image includes a follow light region and the back light region; and
   adjust a state of the back light region, wherein the back light region of the image is a first region in which a subject is irradiated by the light source from a front side of an image capturing position.

2. The image adjustment apparatus according to claim 1, wherein the circuitry is further configured to:
   determine a boundary between the follow light region and the back light region, based on the position of the light source; and
   determine the back light region based on the boundary.

3. The image adjustment apparatus according to claim 2, wherein the circuitry is further configured to adjust the state of the back light region based on the boundary as reference.

4. The image adjustment apparatus according to claim 1, wherein the circuitry is further configured to:
   detect the position of the light source based on a luminance distribution in the image.

5. The image adjustment apparatus according to claim 1, wherein the circuitry is further configured to detect the position of the light source based on a light source detector.

6. The image adjustment apparatus according to claim 1, wherein the circuitry is further configured to detect the position of the light source based on at least one of latitude information, longitude information, or time information at a time of capture of the image.

7. The image adjustment apparatus according to claim 1, wherein the circuitry is further configured to adjust the state of the back light region based on adjustment of an exposure period of time for capture of a subsequent image.

8. The image adjustment apparatus according to claim 1, wherein the circuitry is further configured to adjust the state of the back light region by adjustment of a luminance in displaying the image.

9. The image adjustment apparatus according to claim 1, wherein the circuitry is further configured to adjust a first luminance of the back light region to coincide with a second luminance of the follow light region.

10. The image adjustment apparatus according to claim 9, wherein the circuitry is further configured to adjust the first luminance and the second luminance to coincide with an average of the first luminance and the second luminance.

11. The image adjustment apparatus according to claim 1, wherein the circuitry is further configured to perform adjustment according to an optimal luminance in a display unit on which the image is displayed.

12. The image adjustment apparatus according to claim 1, wherein the follow light region of the image is a second region in which the subject is irradiated by the light source from a back side of the image capturing position.

13. The image adjustment apparatus according to claim 1, wherein the image is captured via a fisheye lens.

14. An image adjustment method, comprising:
   determining a back light region in an image based on a position of a light source, wherein the image includes a follow light region and the back light region; and
   adjusting a state of the back light region, wherein the back light region of the image is a region in which a subject is irradiated by the light source from a front side of an image capturing position.

15. A non-transitory computer-readable medium having stored thereon, computer-executable instructions, which when executed by a processor of an imaging apparatus, cause the imaging apparatus to execute operations, the operations comprising:
   determining a back light region in an image based on a position of a light source, wherein the image includes a follow light region and the back light region; and
   adjusting a state of the back light region, wherein the back light region of the image is a region in which a subject is irradiated by the light source from a front side of an image capturing position.

* * * * *